United States Patent
Wang et al.

(10) Patent No.: US 10,696,592 B2
(45) Date of Patent: Jun. 30, 2020

(54) BLISTER RESISTANT ASPHALT IMPREGNATING COMPOSITION

(71) Applicant: Tremco Incorporated, Beachwood, OH (US)

(72) Inventors: Ge Wang, Solon, OH (US); Richard Ogrocki, Garfield Heights, OH (US)

(73) Assignee: TREMCO INCORPORATED, Beachwood, OH (US)

( * ) Notice: Subject to any disclaimer, the term of this patent is extended or adjusted under 35 U.S.C. 154(b) by 101 days.

(21) Appl. No.: 16/050,040

(22) Filed: Jul. 31, 2018

(65) Prior Publication Data

US 2019/0071352 A1    Mar. 7, 2019

Related U.S. Application Data

(60) Provisional application No. 62/555,302, filed on Sep. 7, 2017.

(51) Int. Cl.
| | |
|---|---|
| C04B 26/26 | (2006.01) |
| C04B 14/42 | (2006.01) |
| E04D 3/18 | (2006.01) |
| C04B 16/06 | (2006.01) |
| E04D 5/02 | (2006.01) |
| C08L 95/00 | (2006.01) |
| C04B 111/00 | (2006.01) |

(52) U.S. Cl.
CPC .............. *C04B 26/26* (2013.01); *C04B 14/42* (2013.01); *C04B 16/0683* (2013.01); *C08L 95/00* (2013.01); *E04D 3/18* (2013.01); *E04D 5/02* (2013.01); *C04B 2111/0075* (2013.01); *C04B 2111/00482* (2013.01); *C04B 2111/00586* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| | | |
|---|---|---|
| 3,281,383 A | 10/1966 | Zelinski et al. |
| 3,639,521 A | 2/1972 | Hsieh |
| 4,172,061 A | 10/1979 | Bresson |
| 4,217,259 A | 8/1980 | Bresson |
| 4,405,680 A | 9/1983 | Hansen |
| 4,530,652 A | 7/1985 | Buck et al. |
| 4,904,713 A | 2/1990 | Vonk et al. |
| 5,051,457 A | 9/1991 | Gelles |
| 5,110,674 A * | 5/1992 | Grube .............. C08L 95/00 428/489 |
| 5,308,676 A | 5/1994 | Gelles et al. |
| 5,331,028 A * | 7/1994 | Goodrich .......... C08L 95/00 524/59 |
| 5,447,775 A | 9/1995 | Gelles |
| 5,718,752 A | 2/1998 | Kluttz |
| 5,854,335 A | 12/1998 | Heimerikx et al. |
| 6,133,350 A | 10/2000 | Klutz |
| 6,743,838 B2 * | 6/2004 | Statz ............... C08L 95/00 523/450 |
| 2004/0172908 A1 * | 9/2004 | Swann ............. E04D 5/12 52/518 |

* cited by examiner

*Primary Examiner* — Christopher M Rodd
(74) *Attorney, Agent, or Firm* — Calfee, Halter & Griswold LLP

(57) ABSTRACT

A blister resistant asphalt impregnating composition comprises asphalt, a linear styrene butadiene block copolymer, a radial styrene butadiene block copolymer, a reactive elastomeric polymer and a fire retardant.

22 Claims, No Drawings

BLISTER RESISTANT ASPHALT IMPREGNATING COMPOSITION

CROSS-REFERENCE TO RELATED APPLICATION

This application claims priority to provisional application Ser. No. 62/555,302, filed Sep. 7, 2017, the disclosure of which is incorporated herein by reference.

BACKGROUND

This invention relates to improvements in the manufacture of so-called "MB cap sheets," which are used for building bituminous membrane roofing systems, i.e., roofing systems composed of one or more layers of a water-proof membrane commonly made for a bituminous material or analog.

As well known in industry, this type of roofing system is typically used for covering "flat" roofs, i.e., roofs which are arranged in a horizontal configuration or a "low slope" roofs, i.e., roofs which are substantially horizontal but sloped enough to allow positive drainage.

When a new bituminous membrane roofing system is being built, the underlayment of the roofing system is normally formed by applying a liquid bituminous composition, e.g., molten bitumen or solvent based bitumen adhesive, to the roof substrate and then applying a pre-formed bituminous membrane over the bituminous composition. This can be done a single time, or multiple times thereby forming a "multi-ply" or "built-up" or "BUR" underlayment. The pre-formed bituminous membranes used for this purpose are usually composed of a carrier such as fiberglass, polyester or felt which is impregnated with bitumen or other similar material.

Once the underlayment is formed, the outermost layer of the roofing system is then applied to complete the bituminous membrane roofing system. As well known in the art, three different approaches are commonly used to form the outermost surface layer of a bituminous membrane roofing system.

In the first, referred to here as the "in-situ aggregate" approach, a layer of bitumen (asphalt) or other adhesive is laid down on the underlayment of the roofing system, i.e., the portion of the roofing system under the outermost layer, and a layer of aggregate typically on the order of about ⅜ inch (~1 cm) in diameter is laid down on and partially embedded in the adhesive.

In the second, referred to here as the "liquid applied membrane" approach, the outermost surface layer is formed by coating the underlayment with a roof coating or covering which forms a relatively thick (i.e., membrane-like) waterproof coating.

In the third, referred to here as the "cap-sheet" approach, the outermost surface layer is formed from multiple pre-formed membranes or sheets (hereinafter "cap-sheets") which are laid up or arranged in an adjacent, overlapping edge fashion (like shingles in a shingle roof) to cover the entire roof surface to be covered. A layer of bitumen (asphalt) or other adhesive is typically used to secure these cap-sheets to one another as well as the underlayment. Typically, these cap-sheets are made from a fibrous web or sheet of fiberglass, polyester fiber or both impregnated with bitumen (asphalt) waterproofing composition. A suitable aggregate is embedded in the asphalt adhesive during manufacture for adding desired color and UV protection for longer service life.

High end cap sheets, which are also referred to as MB cap sheets, are made from polymer modified asphalt coatings which exhibit low temperature flexibility for providing improved low temperature cracking resistance. However, a common problem that occurs in MB cap sheets if any moisture is present in or on the underlayment when these cap sheets are laid down is "blistering" in which small pimples or blisters appear on the surface of the MB cap sheet over time, especially when it has been subjected to wide swings in ambient temperature.

SUMMARY

In accordance with this invention, it has been found that this problem can be largely overcome by including two different types of styrene butadiene block copolymers in polymer modified asphalt impregnating compositions used to make these cap sheets, a linear styrene butadiene block copolymer and a radial or "star" styrene butadiene block copolymer.

DETAILED DESCRIPTION

The chemical composition of the inventive blister resistant asphalt impregnating composition is set forth in Tables 1 and 2 below:

TABLE 1

Chemical Composition of Inventive Asphalt Composition-Organic Binder Only, wt. %

| Component | Operable | Good | Better | Best |
| --- | --- | --- | --- | --- |
| Asphalt | 60-95 | 60-95 | 70-93 | 80-90 |
| Linear Styrene butadiene block copolymer | 4-10 | 4-10 | 5-9 | 6-8 |
| Radial Styrene butadiene block copolymer | 4-10 | 4-10 | 5-9 | 6-8 |
| Reactive elastomeric polymer | 0.1-1.0 | 0.1-1.0 | 0.2-0.7 | 0.3-0.5 |
| Thermoplastic urethane | 0-3 | 0.2-2.0 | 0.4-1.5 | 0.6-1.0 |

TABLE 2

Chemical Composition of Inventive Asphalt Composition-Including Fire Retardant, wt. %

| Component | Operable | Good | Better | Best |
| --- | --- | --- | --- | --- |
| Asphalt | 40-75 | 40-75 | 45-65 | 50-60 |
| Linear Styrene butadiene block copolymer | 1-15 | 1-15 | 2-10 | 3.5-6 |
| Radial Styrene butadiene block copolymer | 1-15 | 1-15 | 2-10 | 3.5-6 |
| Reactive elastomeric polymer | 0-2.5 | 0.08-2.5 | 0.1-2.0 | 0.25-1.0 |
| Thermoplastic urethane | 0.08-3.0 | 0.08-3.0 | 0.1-5.0 | 0.3-2.0 |
| Fire Retardant | 15-50 | 15-50 | 20-40 | 25-37 |

Of these compositions, those in Tables 1 and 2 in which the concentration of reactive elastomeric polymer is 0.15-0.5 wt. %, and in particular 0.2-0.4 wt. % or even 0.25-0.35 wt. %, are especially preferred.

Asphalt

Asphalt, also known as bitumen, is a sticky, black, and highly viscous liquid or semi-solid form of petroleum. It may be found in natural deposits or may be a refined product. Its primary use is in road construction, where it is used as the glue or binder mixed with aggregate particles to create asphalt concrete. Its other main uses are for bituminous waterproofing products, including production of roofing felt and for sealing flat roofs. In the context of this application, "asphalt" refers to unmodified or "raw" asphalt in contrast to asphalt which has been modified by various different additives.

Any asphalt that has been used for, or is useful for, road paving applications can be used to make the inventive blister resistant asphalt roofing composition. Normally, Performance Grade ("PG") asphalts will be used for this purpose. As well understood in the art, the Performance Grade (PG) system is a method of categorizing an asphalt cement binder for use in asphalt pavement applications relative to its performance at different temperatures. It is based on the concept that asphalt binder properties should be related to the conditions under which the binder is used including air and pavement temperatures.

The physical properties of asphalt cement change with temperature, i.e., asphalt cement is stiffer at lower temperatures and relatively softer at higher temperatures. PG asphalt binders are categorized and selected to meet performance criteria at expected high and low temperature extremes with a certain level of reliability.

An example of a performance graded binder is PG 58-28. PG indicates that it is a performance graded binder. The first two numbers (58) indicate that the binder meets high temperature physical properties up to 58 degrees Celsius (58° C.=136° F.). The last two numbers (–28) indicate the binder meets low temperature physical properties down to –28 degrees Celsius (–28° C.-19° F.). PG 58-28, as well as other Performance Grade asphalts including PG 46-34, PG 46-28, PG 52-28, PG 58-22 and PG 64-22, can be used to make the blister resistant asphalt impregnating composition of this invention.

Linear Styrene Butadiene Block Copolymer

In addition to asphalt, the inventive blister resistant asphalt impregnating composition also includes a linear styrene butadiene block copolymer. Mixtures of these linear styrene butadiene block copolymers can also be used.

Any block copolymer of styrene and butadiene which has a linear structure and which also has been used for, or is useful for, compounding with asphalt can be used as the linear styrene butadiene block copolymer of this invention. "Copolymer" in this context includes any polymer made from two or more comonomers including terpolymers, for example. Normally, these styrene butadiene rubbers will contain 10 to 50 wt. % styrene, more typically 20 to 40 wt. % or even 25 to 35 wt. % styrene, with the balance being butadiene.

Such block copolymers are known and described in a variety of different references including U.S. Pat. Nos. 5,854,335, 4,405,680, 5,308,676, 5,051,457, 4,904,713, 5,447,775 and 6,133,350, the disclosures of which are incorporated herein by reference. As described there, these polymers may be partially hydrogenated, if desired. If so, they may also be referred to as SEBS (styrene ethylene butadiene styrene) block copolymers.

Preferred linear block copolymers for use in this invention include those which are primarily made up of three segments, a middle segment comprising polybutadiene flanked on each side with a polystyrene segment. Desirably, such block copolymers contain 20 to 40 wt. % or even 25 to 35 wt. % styrene and exhibit a diblock content of 25 wt. % or less, preferably 20 wt. % or less or even 15 wt. % or less. In addition, they also typically exhibit a molecular weight (test method BP 540) of 90-200,000 Da, more typically 100,000-170,000 Da, 105,000-150,000 Da or even 110,000-130,000 Da. If desired, such block copolymers may also exhibit a Brookfield Viscosity (ASTM D 1084) of 3,000-7,000, more typically 4,000-6,200 or even 5,000-5,800 cps.

Specific examples of commercially available linear styrene butadiene block copolymers that can be used to make the inventive blister resistant asphalt impregnation compositions include the GP line of SBS block copolymers available from General Industrial Polymers, LLC of Baytown, Tex., especially the SBS-GP 3000 series and SBS-GP 4000 series of these block copolymers.

Radial Styrene Butadiene Block Copolymer

In addition to asphalt and a linear styrene butadiene block copolymer, the inventive blister resistant asphalt impregnating composition also includes a radial (aka "branched" or "star-type") styrene butadiene block copolymer. Mixtures of these radial styrene butadiene block copolymers can also be used.

For this purpose, any block copolymer of styrene and butadiene which has a radial structure and which also has been used for, or is useful for, compounding with asphalt can be used. "Copolymer" in this context includes any polymer made from two or more comonomers including terpolymers, for example. Normally, these styrene butadiene rubbers will contain 10 to 50 wt. % styrene, more typically 20 to 40 wt. %, 25 to 35 wt. %, or even 29-33 wt. % styrene, with the balance being butadiene.

Such block copolymers are known and described in a variety of different references including U.S. Pat. Nos. 3,281,383, 3,639,521, 4,172,061, 4,217,259, 4,530,652 and 5,718,752, the disclosures of which are incorporated herein by reference.

Preferred block copolymers of this type include those which have the following structure $$(A\text{-}B)_n$$

wherein A refers to a copolymer unit derived from styrene and B refers to a copolymer unit derived from a conjugated-diene. Desirably, such block copolymers contain 20 to 40 wt. % or even 25 to 35 wt. % styrene and exhibit a diblock content of 25 wt. % or less, preferably 20 wt. % or less. If desired, such block copolymers may also exhibit a Solution Viscosity (BAM 922) of 500-2,000, more typically 700-1,800 or even 900-1300 cP. In addition, these block copolymers may have weight average molecular weights of about 100,000 to about 1,000,000, more typically from 150,000 to 750,000, and still more typically from 200,000 to 500,000, as determined by using conventional gel permeation chromatography.

Specific examples of commercially available radial styrene butadiene block copolymers that can be used to make the inventive blister resistant asphalt impregnation compositions include the KRATON®, EUROPRENE SOL® and SOLPRENE® lines of styrene butadiene block copolymers available from Shell Chemical Company, Enichem and Phillips Petroleum Company, respectively. The KRATON® D line of radial styrene butadiene block copolymers, and in particular Kraton D1184 and Kraton D1401 P, are especially interesting.

In addition to maintaining the concentration of the linear and radial styrene butadiene block copolymers of this invention within the ranges set forth in the above Tables 1 and 2, it is also desirable that the linear/radial weight ratio of these copolymers in any particular asphalt impregnating composition be maintained between about 5:1-1:5, more typically 4:1-1:4, 3:1-1:3, 2:1-1:2, 1.5:1-1:1.5 or even 1.25:1-1:1.25.

Reactive Elastomeric Polymer

The inventive asphalt impregnating composition also includes a reactive elastomeric polymer. For this purpose, any copolymer which is elastomeric and which contains glycidyl and/or epoxide functionality can be used. These reactive elastomeric polymers are well known. See, for example, U.S. Pat. No. 9,617,424, the disclosure of which is incorporated herein by reference in its entirety as well as the product literature available from DuPont regarding its ELVALOY® RET asphalt modifiers.

As described there, because of their glycidyl and/or epoxide functionality, these polymers are capable of bonding with asphalt. For this reason, and because of the elastomeric nature of the polymer as a whole, combining these polymers with conventional asphalt produces a modified asphalt exhibiting superior binding properties at widely varying temperatures.

Specific examples of these polymers include reactive elastomeric terpolymers (RET) a non-limiting example of which includes alkylene-alky acrylate-glycidyl acrylate terpolymers; polymers having glycidyl or glycidyl acrylate functionality a non-limiting example of which includes alkylene-alkylacrylate-glycidyl acrylate terpolymers, and polymers having an epoxide functionality. A non-limiting example of a suitable alkylene-alkylacrylate-glycidyl acrylate terpolymers that can be used to make the inventive blister resistant asphalt impregnation compositions includes ethylene-butyl acrylate-glycidyl methacrylate terpolymers, a commercial example of which are Elvaloy. Elvaloy terpolymer is believed to be an ethylene-butyl acrylate (BA)-glycidyl methacrylate (GMA) terpolymer having an exemplary composition such as 28 wt % BA and 5.3 wt % GMA or 20 wt % BA and 9 wt % GMA (the balance being ethylene in both).

Thermoplastic Urethane

An additional optional ingredient of the blister resistant asphalt impregnating compositions of this invention is a polybutadiene-based thermoplastic urethane. These polymers are thermoplastic elastomers which are formed by reacting a diisocyanate and optional chain extender with a polybutadiene based diol. The result is a linear polymer molecule containing polybutadiene soft blocks and polyurethane hard blocks.

Polyurethanes exhibit many beneficial properties including chemical resistance, weather resistance, toughness, strength, etc. However, because conventional polyurethanes are generally incompatible with various types of rubber compounds, mixtures of the two are not normally used. However, because the polybutadiene soft segments of a polybutadiene-based thermoplastic urethane are capable of bonding (curing) with traditional rubber compounds, these polybutadiene-based thermoplastic urethanes are compatible with traditional rubbers. The result is that new rubber compositions can be obtained which exhibit superior chemical properties (e.g., chemical resistance, improved weatherability) and physical properties (e.g., tensile strength, tear resistance, shear modulus, flex fatigue resistance).

Polybutadiene-based thermoplastic urethanes are commercially available. For example, they can be obtained from Cray Valley Hydrocarbon Specialty Chemicals, a subsidiary of Total Oil Company of Paris, France.

Fire Retardant

The inventive blister resistant asphalt impregnating composition can also contain a fire retardant, if desired. Any conventional fire retardant can be used for the is purpose, examples of which include aluminum trihydrate and ammonium polyphosphate. Mixtures of these fire retardants can also be used.

Trade-Off Between Viscosity and Softening Point

As indicated above, a common problem that occurs in MB cap sheets if any moisture is present in or on the underlayment when these cap sheets are laid down is "blistering" in which small pimples or blisters appear on the surface of the MB cap sheet over time, especially when it has been subjected to wide swings in ambient temperature. In accordance with this invention, it has been found that this problem can be largely eliminated if the polymer modified asphalt impregnating compositions from which these cap sheets are made has an initial softening point of at least 245° F. (~118° C.), preferably 250° F. (~121° C.) or even at least 255° F. (~124° C.).

The problem, however, is that those chemical modifications that can be used to increase the initial softening point of a polymer modified asphalt impregnating composition can also result in a corresponding substantial increase in the viscosity of the composition to the point where it can no longer be used as an impregnating composition, as a practical matter.

For example, asphalt impregnating compositions exhibiting an initial Brookfield viscosity of about 25,000 cps or more are generally regarded as being too difficult to use for impregnation purposes, as they flow too slowly to engulf the substrate being impregnated in a commercially reasonable time frame. In this context, an "initial" Brookfield viscosity will be understood to mean the viscosity of the composition as soon as it is heated to a temperature which is just high enough to be useful for impregnating, normally 375° F. (~191° C.), in contrast to its viscosity after being maintained at that temperature for any appreciable period of time such as 30 minutes or more.

In accordance with this invention, this apparent trade-off is broken by using a reactive elastomeric polymer containing glycidyl and/or epoxide functionality to alter a polymer-modified asphalt impregnating composition containing both a linear and a radial styrene butadiene block copolymer. In particular, it has been found in accordance with this invention that, by suitable selection of the amounts of radial styrene butadiene block copolymer and reactive elastomeric polymer used, it possible to provide a polymer-modified asphalt impregnating composition which exhibits an initial softening point of at least 245° F. (~118° C.), preferably 250° F. (~121° C.) or even at least 255° F. (~124° C.), as well as an initial Brookfield viscosity of less than 25,000 cps. Especially preferred compositions in accordance with this invention exhibit an initial softening temperature of at least 245° F. (~118° C.), preferably 250° F. (~121° C.) or even at least 255° F. (~124° C.), as well as an initial Brookfield viscosity of less than 22,500 cps and even less than 20,000 cps.

EXAMPLES

In order to more thoroughly describe this invention, the following working examples are provided. In these examples, polymer modified asphalt compositions were made up using various amounts of linear SBS block copolymers, radial SBS block copolymers and reactive elastomeric polymers, after which the asphalt compositions so obtained were tested to determine their softening points (ASTM-D3461) and initial Brookfield viscosities (ASTM-D4402 measured at 375° F. (~191° C.)).

Five different polymer modified asphalt compositions were prepared, each containing 57.94 wt. % PG 58-28 Asphalt, a total of 8.72 wt. % SBS block copolymer, 0.29 wt.

% of a reactive elastomeric polymer, 29.06 wt. % of an alumina trihydrate fire retardant and 4.00 wt. % of an ammonium polyphosphate fire retardant, with the ratio of linear to radial SBS block copolymers in these compositions varying between 100/0 and 0/100. The results obtained are set forth in the following Table 1:

TABLE 3

Fire Retardant Composition
Effect of Star Type SBS Polymer on Softening Point and Initial Viscosity

| | Ratio of linear to radial SBS polymer | | | | |
|---|---|---|---|---|---|
| | 100/0 | 75/25 | 50/50 | 25/75 | 0/100 |
| Linear SBS (LCY 3501) | 8.72 | 6.54 | 4.36 | 2.18 | 0.00 |
| Radial SBS (Kraton D1184) | 0.00 | 2.18 | 4.36 | 6.54 | 8.72 |
| Softening Point, initial ° F. | 247.3 | 249.4 | 251.6 | 255.1 | 258.7 |
| Brookfield viscosity, initial, cps @ 375° F. | 15520 | 16540 | 18020 | 22520 | 30080 |

As can be seen from this table, the initial softening point of these compositions can be raised to the desirable level of at least 250° F. (~121° C.) by including a sufficient amount of a radial SBS block copolymer in the composition. However, in addition to raising softening temperature, this ingredient also causes a corresponding increase in initial viscosity as well such that, when the relative amount of radial SBS polymer increased to somewhat more than about 75% (i.e., when the linear/radial SBS ratio increased to over about 75/25), the initial viscosity of the composition became undesirably high, exceeding about 25,000 cps. This shows that, in an asphalt composition modified with an SBS linear block copolymer, the softening temperature of the composition can be raised to the desirable level of 250° F. (~121° C.) or more without increasing the initial Brookfield viscosity of the composition above the undesirable maximum of about 25,000 cps, by including a suitable amount, but not too much, of a radial SBS block copolymer in the composition.

Although only a few embodiments of this invention have been described above, it should be appreciated that many modifications can be made without departing from the spirit and scope of this invention.

All such modifications are intended to be included within the scope of this invention, which is to be limited only by the following claims:

1. A blister resistant asphalt impregnating composition comprising 60-95 wt. % asphalt, 4-10 wt. % linear styrene butadiene block copolymer, 4-10 wt. % radial styrene butadiene block copolymer, 0.1-0.4 wt. % reactive elastomeric polymer and 0-3 wt. % of a thermoplastic urethane, these percents being based on the weight of these five ingredients.

2. The blister resistant asphalt impregnating composition of claim 1, wherein the composition comprises 70-93 wt. % asphalt, 5-9 wt. % linear styrene butadiene block copolymer, 5-9 wt. % radial styrene butadiene block copolymer and 0.2-0.4 wt. % reactive elastomeric polymer.

3. The blister resistant asphalt impregnating composition of claim 2, wherein the composition comprises 80-90 wt. % asphalt, 6-8 wt. % linear styrene butadiene block copolymer, 6-8 wt. % radial styrene butadiene block copolymer and 0.3-0.4 wt. % reactive elastomeric polymer.

4. The blister resistant asphalt impregnating composition of claim 1, wherein the composition comprises 0.2-2 wt. % of a thermoplastic urethane.

5. The blister resistant asphalt impregnating composition of claim 1, wherein the composition comprises is 0.15-0.4 wt. % reactive elastomeric polymer.

6. The blister resistant asphalt impregnating composition of claim 5, wherein the composition comprises 0.2-0.4 wt. % reactive elastomeric polymer.

7. The blister resistant asphalt impregnating composition of claim 1, wherein the softening temperature of the composition is at least 250° F. (121° C.) and further wherein the initial Brookfield viscosity of the composition is no greater than about 25,000 cps.

8. The blister resistant asphalt impregnating composition of claim 7, wherein the initial Brookfield viscosity of the composition is less than about 22,500 cps.

9. The blister resistant asphalt impregnating composition of claim 1, wherein the reactive elastomeric polymer is a reactive elastomeric terpolymer (RET).

10. The blister resistant asphalt impregnating composition of claim 9, wherein the reactive elastomeric polymer is an alkylene-alky acrylate-glycidyl acrylate terpolymer.

11. A cap sheet for use in building a bituminous membrane roofing system comprising a web made from fiberglass, polyester or both which is impregnated with the blister resistant asphalt impregnating composition of claim 1.

12. A blister resistant asphalt impregnating composition comprising 40-75 wt. % asphalt, 1-15 wt. % linear styrene butadiene block copolymer, 1-15 wt. % radial styrene butadiene block copolymer, 0.1-0.4 wt. % reactive elastomeric polymer, 0-3.0wt. % of a thermoplastic urethane and 15-50 wt. % of one or more fire retardants, these percents being based on the weight of the composition as a whole.

13. The blister resistant asphalt impregnating composition of claim 12, wherein the composition comprises 45-65 wt. % asphalt, 2-10 wt. % linear styrene butadiene block copolymer, 2-10 wt. % radial styrene butadiene block copolymer, and 20-40 wt. % of a fire retardant.

14. The blister resistant asphalt impregnating composition of claim 13, wherein the composition comprises 50-60 wt. % asphalt, 3.5-6.0 wt. % linear styrene butadiene block copolymer, 3.5-6.0 wt. % radial styrene butadiene block copolymer, and 25-37 wt. % of a fire retardant.

15. The blister resistant asphalt impregnating composition of claim 12, wherein the composition comprises 0.08-3.0 wt. % of a thermoplastic urethane.

16. The blister resistant asphalt impregnating composition of claim 12, wherein the composition comprises is 0.15-0.4 wt. % reactive elastomeric polymer.

17. The blister resistant asphalt impregnating composition of claim 16, wherein the composition comprises 0.2-0.4 wt. % reactive elastomeric polymer.

18. The blister resistant asphalt impregnating composition of claim 12, wherein the softening temperature of the composition is at least 250° F. (121° C.) and further wherein the initial Brookfield viscosity of the composition is no greater than about 25,000 cps.

19. The blister resistant asphalt impregnating composition of claim 18, wherein the initial Brookfield viscosity of the composition is less than about 22,500 cps.

20. The blister resistant asphalt impregnating composition of claim 12, wherein the reactive elastomeric polymer is a reactive elastomeric terpolymer (RET).

21. The blister resistant asphalt impregnating composition of claim 20, wherein the reactive elastomeric polymer is an alkylene-alky acrylate-glycidyl acrylate terpolymer.

22. A cap sheet for use in building a bituminous membrane roofing system comprising a web made from fiberglass, polyester or both which is impregnated with the blister resistant asphalt impregnating composition of claim 12.

* * * * *